(12) United States Patent
Jiang et al.

(10) Patent No.: US 10,341,928 B2
(45) Date of Patent: Jul. 2, 2019

(54) SYSTEMS AND METHODS OF A PORTABLE DEVICE ROAMING BETWEEN A PLURALITY OF ACCESS POINT DEVICES WITH WHICH THE PORTABLE DEVICE IS ENROLLED

(71) Applicant: Honeywell International Inc., Morristown, NJ (US)

(72) Inventors: Hongye Jiang, Shanghai (CN); Bin Yang, Shanghai (CN); Kenneth Eskildsen, Great Neck, NY (US)

(73) Assignee: ADEMCO INC., Golden Valley, MN (US)

( * ) Notice: Subject to any disclaimer, the term of this patent is extended or adjusted under 35 U.S.C. 154(b) by 136 days.

(21) Appl. No.: 15/665,633

(22) Filed: Aug. 1, 2017

(65) Prior Publication Data
US 2019/0045418 A1  Feb. 7, 2019

(51) Int. Cl.
*H04W 36/36* (2009.01)
*H04W 36/00* (2009.01)
(Continued)

(52) U.S. Cl.
CPC ....... *H04W 36/36* (2013.01); *H04W 36/0055* (2013.01); *H04W 76/11* (2018.02); *H04W 24/02* (2013.01); *H04W 36/0016* (2013.01)

(58) Field of Classification Search
CPC . H04W 36/36; H04W 36/0055; H04W 76/11; H04W 36/0016; H04W 24/02;
(Continued)

(56) References Cited

U.S. PATENT DOCUMENTS

| 7,339,883 | B2 | 3/2008 | Santhoff et al. |
| 8,155,081 | B1 * | 4/2012 | Mater ............ H04W 4/04 370/254 |

(Continued)

FOREIGN PATENT DOCUMENTS

WO    WO 2016/011433 A2    1/2016

OTHER PUBLICATIONS

Extended European search report for corresponding EP patent application 18183502.6, dated Oct. 2, 2018.
(Continued)

*Primary Examiner* — Brenda H Pham
(74) *Attorney, Agent, or Firm* — Husch Blackwell LLP

(57) ABSTRACT

Systems and methods of a portable device roaming between a plurality of access point devices with which the portable device is enrolled are provided. Some methods can include the portable device saving a respective network parameter of each of the plurality of access point devices, the portable device traversing a plurality of channels in which the plurality of access point devices operate, the portable device operating in a respective one of the plurality of channels to receive a packet from a respective one of the plurality of access point devices, the portable device comparing a received network identifier in the packet with the respective network parameter of each of the plurality of access point devices as saved, and responsive to a match, the portable device transmitting a command signal to the respective one of the plurality of access point devices.

18 Claims, 4 Drawing Sheets

(51) Int. Cl.
*H04W 76/11* (2018.01)
*H04W 24/02* (2009.01)

(58) Field of Classification Search
CPC ..... H04W 84/12; H04W 88/08; H04W 80/04; H04W 88/06; H04W 84/18; H04W 74/08; H04W 36/18; H04W 36/0011; H04W 36/14; H04W 36/08; H04W 36/30; H04W 36/24; H04W 8/26; H04L 2012/5608
USPC ............ 370/310.2, 328, 338, 331, 332, 349
See application file for complete search history.

(56) References Cited

U.S. PATENT DOCUMENTS

| | | |
|---|---|---|
| 8,213,482 B2 | 7/2012 | Keshavarzian et al. |
| 2004/0246922 A1* | 12/2004 | Ruan ................. H04W 48/20 370/331 |
| 2006/0025128 A1* | 2/2006 | Lee ................. H04W 36/0083 455/432.1 |
| 2010/0303051 A1* | 12/2010 | Umeuchi .............. H04W 48/16 370/338 |
| 2011/0103318 A1 | 5/2011 | Ekici et al. |
| 2013/0329690 A1 | 12/2013 | Kim et al. |
| 2014/0188348 A1 | 7/2014 | Gautama et al. |

OTHER PUBLICATIONS

IEEE Standard for Local and metropolitan area networks—Part 15.4: Low-Rate Wireless Personal Area Networks (LR-WPANS), IEEE Std 802.15.4TM-2011, Revision of IEEE Std 802.15.4-2006, IEEE Computer Society, New York, NY, dated Sep. 5, 2011.
IEEE Standard for Local and metropolitan area networks—Part 15.7: Short-Range Wireless Optical Communication Using Visible Light, IEEE Std 802.15.7TM-2011, IEEE Computer Society, New York, NY, dated Sep. 6, 2011.

* cited by examiner

US 10,341,928 B2

SYSTEMS AND METHODS OF A PORTABLE DEVICE ROAMING BETWEEN A PLURALITY OF ACCESS POINT DEVICES WITH WHICH THE PORTABLE DEVICE IS ENROLLED

FIELD

The present invention relates to a portable device. More particularly, the present invention relates to systems and methods of the portable device roaming between a plurality of access point devices with which the portable device is enrolled.

BACKGROUND

It is known that an access point device can be the coordinator, the center, and the initiator of an IEEE 802.15.4 based low power wireless personal area network (WPAN). However, due to the limitations of wireless protocols and the limited memory in access point devices, the number of wireless sensor devices connected to a single access point device is limited. For example, some known access point devices can be connected to 64 sensor device nodes or 128 sensor device nodes. In known RF6 WPANs, one access point device can support 128 sensor device nodes.

When known commercial wireless systems require and support hundreds or thousands of sensor devices, multiple access point devices are required to connect the sensor devices, and the multiple access point devices must also be connected to a control panel device in a corresponding wired or wireless manner. For example, as seen in FIG. 1, the access point devices AP1-AP8 can be connected to the control panel device 100 via a wired or wireless data bus 110, and each of the access point devices AP1-AP8 can coordinate a respective WPAN for connecting to a respective plurality of sensor devices. In known RF6 WPANs, the control panel device can support 1024 sensor device nodes by connecting eight access point devices. However, such configurations present a problem with the access point devices receiving signals from a portable device.

In known systems and methods that operate using an IEEE 802.15.4 protocol, a portable device, such as a RF6 key fob, can enroll with one of the access point devices. For example, the portable device can save in nonvolatile memory the network parameter of the one of the access point devices with which the portable device is enrolled, and the network parameter can include a specific channel identifier, a network identifier, such as a PANID, and an encryption key. When a user provides user input to a user interface device of the portable device, such as pressing a button on the portable device, the portable device can operate in the specific channel, receive the network identifier in a beacon signal from the one of the access point devices with which the portable device is enrolled, use the encryption key to decrypt a payload of the beacon signal, and responsive thereto, transmit a command signal to the one of the access point devices, which can transmit a corresponding command signal to the control panel device.

However, in known systems and methods, the portable device can only be enrolled with the one of the access point devices and cannot roam between the access point devices. For example, each of the access point devices operates in a respective one of a plurality of channels, and it is known that the portable device can traverse the plurality of channels and stay on each of the plurality of channels for a period of time, such as 500 milliseconds, to find the respective one of the channels on which the one of the plurality of access point devices with which the portable device is enrolled operates so that the portable device can receive the beacon signal from the one of the access point devices with which the portable device is enrolled. However, in such known systems and methods, the portable device might wait a long time to receive the beacon signal. Furthermore, the one of the access point devices may have a late response depending on when the user provides the user input to the portable device to initiate the portable device traversing the plurality of channels to receive the beacon signal. This results in a poor user experience.

In view of the above, there is a continuing, ongoing need for improved systems and methods.

DETAILED DESCRIPTION

Figure 1:
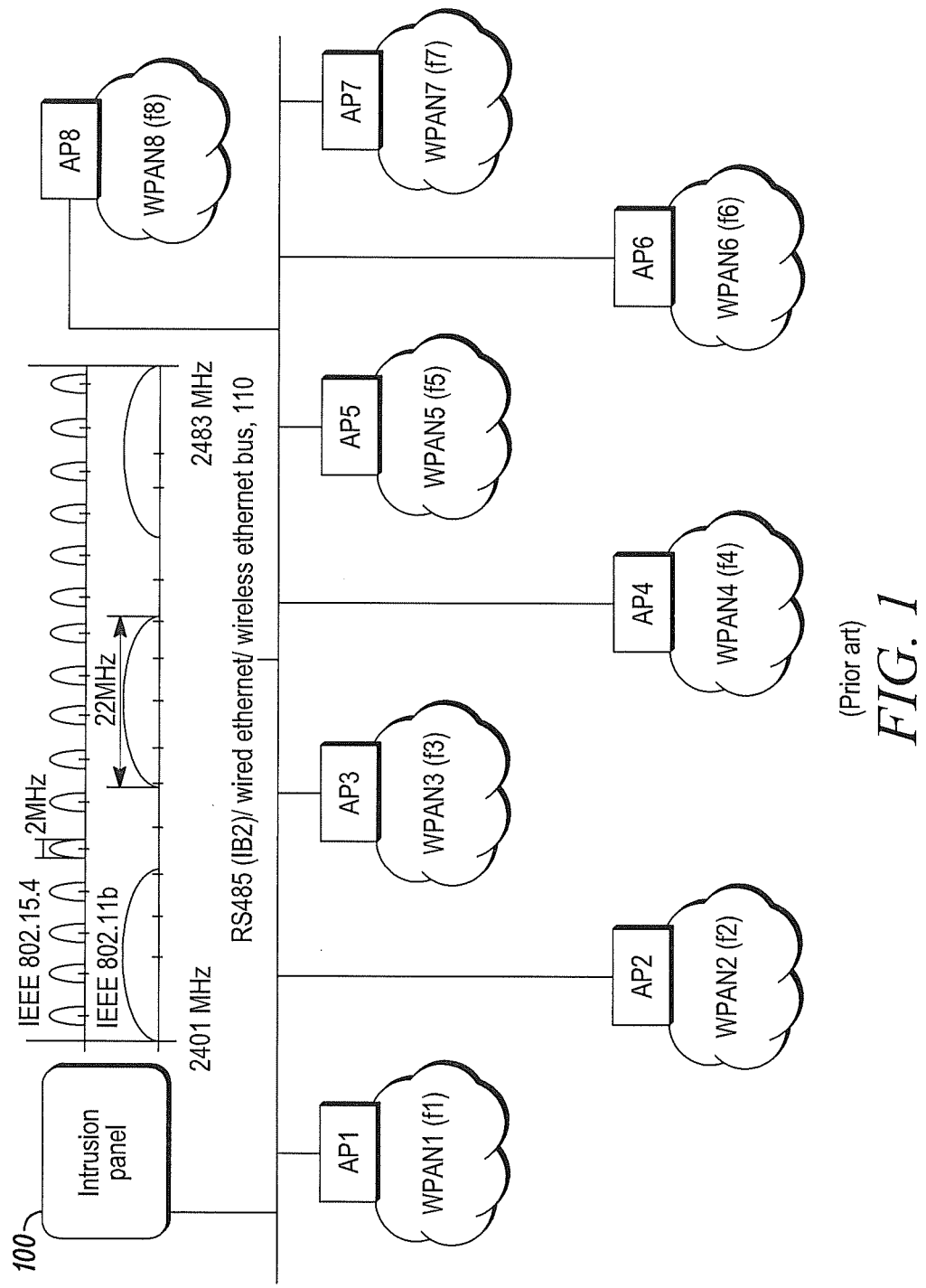
FIG. 1 is a block diagram of a system known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods of a portable device, such as a RF6 key fob, roaming between a plurality of access point devices with which the portable device is enrolled. For example, the portable device can save a respective network parameter of each of the plurality of access point devices connected to a single control panel device and with which the portable device is enrolled in a list in nonvolatile memory of the portable device and can use the respective network parameter of each of the plurality of access point devices to roam between the plurality of access point devices.

In some embodiments, to enroll with each of the plurality of access point devices, a user can bring the portable device within a predetermined distance of a respective one of the plurality of access point devices and provide user input to a user interface device of the portable device, such as pressing a combination of buttons on the portable device, that, responsive thereto, causes the portable device to enter an enrollment mode. Once in enrollment mode, the portable device can receive and save the respective network parameter of the respective one of the plurality of access points in the memory device of the portable device.

Figure 2:
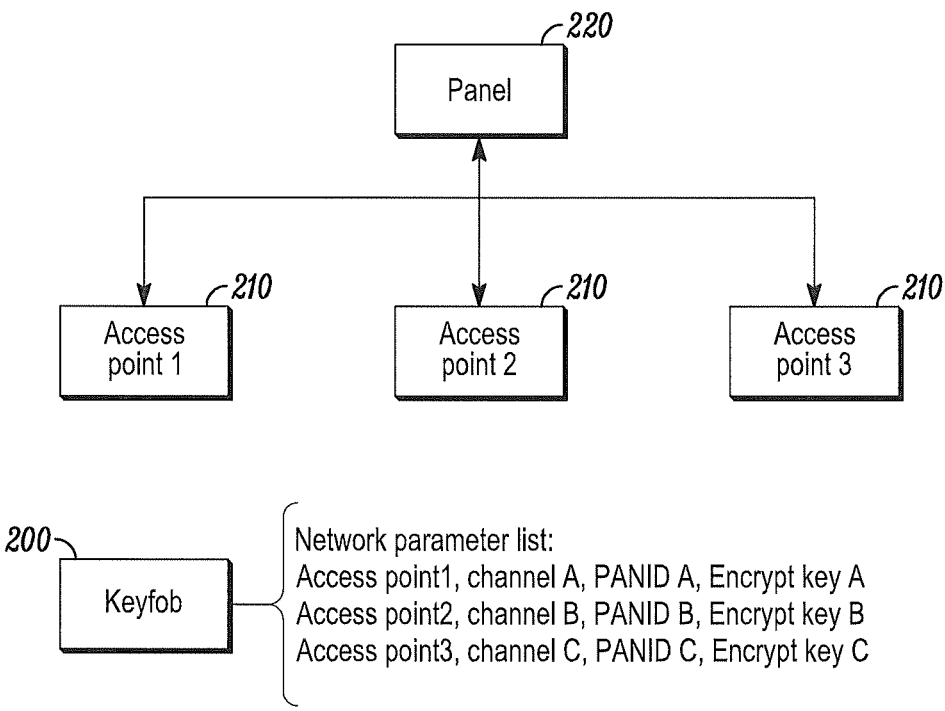
FIG. 2 is a block diagram of a portable device that is enrolled with a plurality of access point devices connected to a control panel device in accordance with disclosed embodiments.

For example, FIG. 2 is a block diagram of a portable device 200 that is enrolled with a plurality of access point devices 210 connected to a control panel device 220 in accordance with disclosed embodiments. As seen in FIG. 2, the portable device 200 can include a list of the respective network parameter of each of the plurality of access point devices 210.

Figure 3:
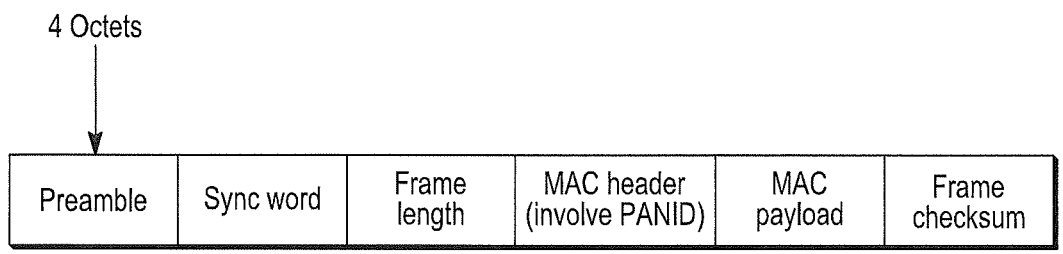
FIG. 3 is a block diagram of an IEEE 802.15.4 frame format known in the art.
Figure 4:
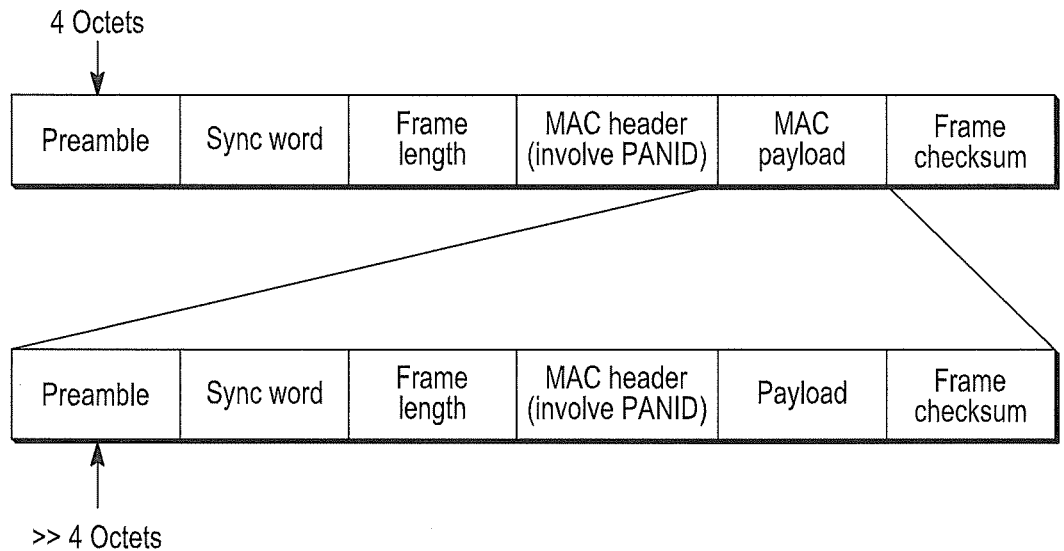
FIG. 4 is a block diagram of a packet with an IEEE 802.15.4 frame format and a long, extended preamble in accordance with disclosed embodiments.

Each of the plurality of access point devices can operate in a respective one of a plurality of channels, and in some embodiments, systems and methods disclosed herein can include each of the plurality of access point devices periodically broadcasting a respective packet with a respective long, extended preamble. For example, in some embodiments, the respective packet broadcast from each of the plurality of access point devices can use a RF6 protocol and an IEEE 802.15.4 frame format. As seen in FIG. 3, in known systems and methods, the length of a preamble of the IEEE 802.15.4 frame format is fixed at 4 octets. However, as seen in FIG. 4, systems and methods disclosed herein can generate a packet with the same structure of known IEEE 802.15.4 frame formats and a long, extended preamble length in a MAC payload of the frame format.

Figure 5:
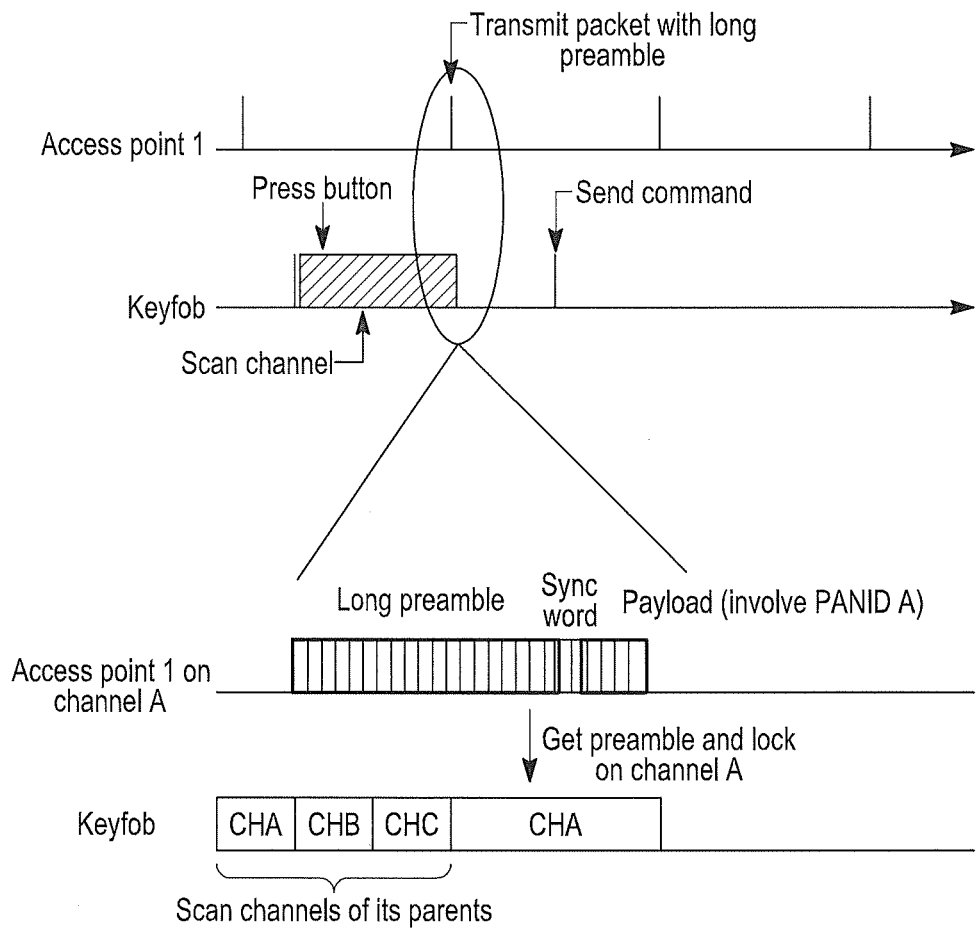
FIG. 5 is a graph depicting the timing of a portable device scanning a plurality of channels and fixing on one of the plurality of channels to receive a long, extended preamble of a packet in accordance with disclosed embodiments.
Figure 6:
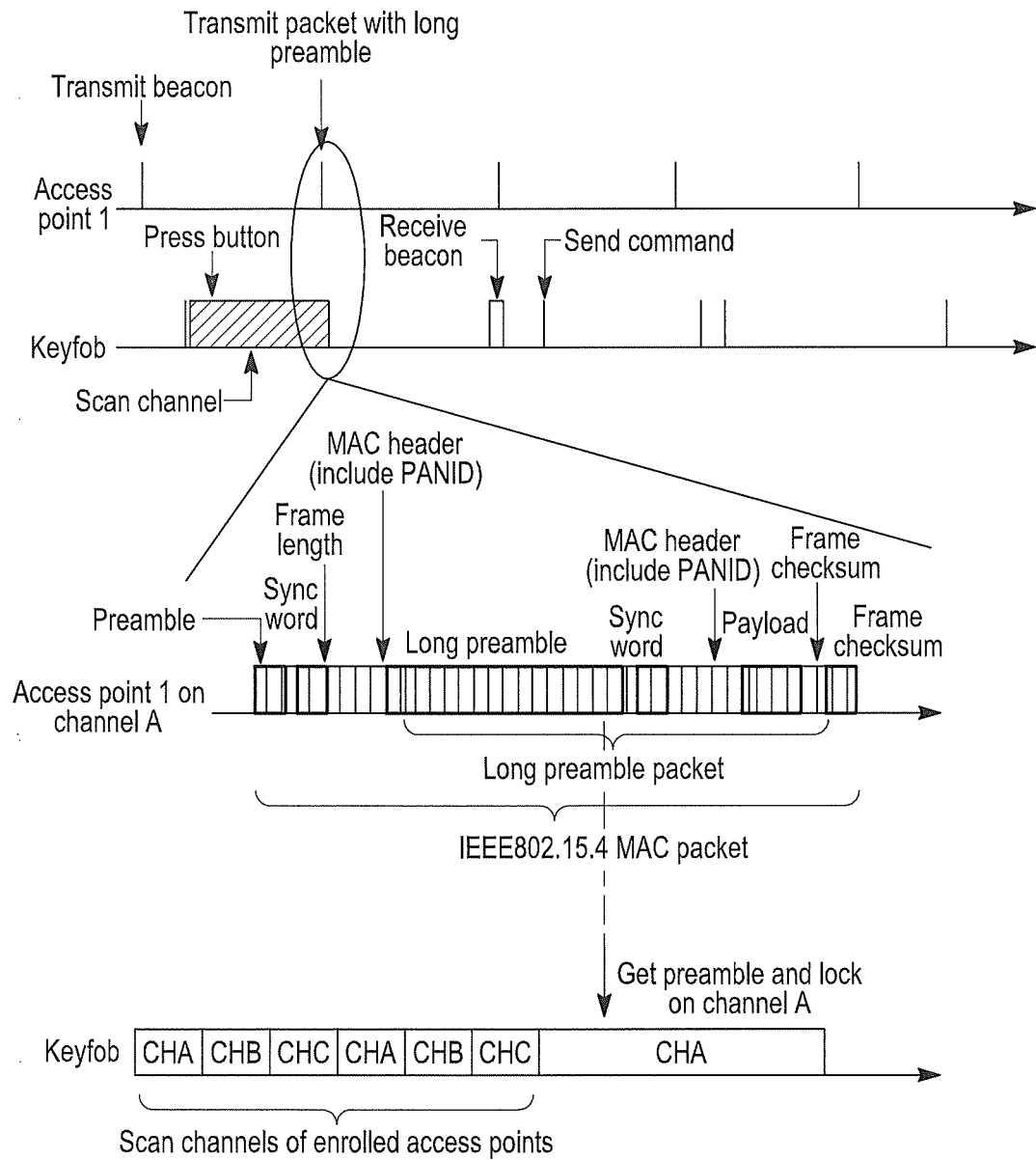
FIG. 6 is a graph depicting the timing of a portable device scanning a plurality of channels and fixing on one of the plurality of channels to receive a long, extended preamble of a packet in accordance with disclosed embodiments.

When the user provides user input to the user interface device of the portable device, such as pressing a button on the portable device, the portable device can exit a sleep mode, activate a radio receiver of the portable device, and as seen in FIG. 5 and FIG. 6, search for the plurality of access point devices within range of the portable device by traversing the plurality of channels in which the plurality of access point devices with which the portable device is enrolled operate. For example, when traversing the plurality of channels, the portable device can periodically, for example, every 40 µs, measure a received energy level in a respective one of the plurality of channels and compare the received energy level with a predetermined energy threshold level. If the received energy level is below the predetermined energy threshold level, then the portable device can switch to a next one of the plurality of channels.

However, as seen in FIG. 5 and FIG. 6, when the received energy level is above the predetermined energy threshold level, the portable device can remain operating in the respective one of the plurality of channels. That is, in some embodiments, the portable device will not switch from operating in the respective one of the plurality of channels when a signal quality of a preamble symbol of a detected packet is above the predetermined energy threshold level, thereby allowing the portable device to receive the packet in the respective one of the plurality of channels. Under these circumstances, the portable device can remain operating in the respective one of the plurality of channels to receive the entire packet.

After the packet is received, the portable device can compare a received network identifier, such as a PANID, in the packet with a plurality of saved network identifiers from the list of the respective network parameter of each of the plurality of access point devices. In some embodiments, when the received network identifier in the packet fails to match any of the plurality of saved network identifiers, the portable device can restart traversing the plurality of channels. However, when the received network identifier in the packet matches one of the plurality of saved network identifiers, the portable device can capture the respective one of the plurality of access point devices that corresponds to the one of the plurality of saved network identifiers and can use the received network identifier and the one of the plurality of saved network identifiers to transmit a command signal to the respective one of the plurality of access point devices in a respective time slot. As those of skill will understand, the respective one of the plurality of access point devices can then transmit a corresponding command signal to the control panel device.

In accordance with the above, the portable device can locate a WPAN of the respective one of the plurality of access point devices within range of the portable device during the time period that the respective long, extended preamble of the packet is transmitting from the respective one of the plurality of access point devices, thereby providing a good user experience. In some embodiments, this time period can be approximately 250 milliseconds.

It is to be understood that each of the portable device, the plurality of access point devices, and the control panel device disclosed herein can include a respective transceiver device, a respective user interface device, and a respective memory device each of which can be in communication with respective control circuitry, a respective programmable processor, and respective executable control software as would be understood by one of ordinary skill in the art. Each of the respective executable control software can be stored on a respective transitory or non-transitory computer readable medium, including, but not limited to local computer memory, RAM, optical storage media, magnetic storage media, flash memory, and the like. In some embodiments, some or all of the respective control circuitry, the respective programmable processors, and the respective executable control software can execute and control at least some of the methods disclosed herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
a portable device saving a respective network parameter of each of a plurality of access point devices in a memory device of the portable device;
the portable device traversing a plurality of channels in which the plurality of access point devices operate;
the portable device operating in a respective one of the plurality of channels to receive a packet from a respective one of the plurality of access point devices;
the portable device comparing a received network identifier in the packet with the respective network parameter of each of the plurality of access point devices in the memory device of the portable device;
responsive to a match between the received network identifier in the packet and the respective network parameter of the respective one of the plurality of access point devices in the memory device of the portable device, the portable device transmitting a command signal to the respective one of the plurality of access point devices; and
responsive to the received network identifier in the packet failing to match the respective network parameter of any of the plurality of access point devices in the memory device of the portable device, the portable device restarting traversing the plurality of channels in which the plurality of access point devices operate.

2. The method of claim 1 wherein the packet includes a long, extended preamble.

3. The method of claim 2 wherein the packet includes an IEEE 802.15.4 frame format and includes the long, extended preamble in a MAC payload of the packet.

4. The method of claim 1 further comprising the portable device receiving user input to exit a sleep mode, activate a radio receiver of the portable device, and traverse the plurality of channels in which the plurality of access point devices operate.

5. The method of claim 1 further comprising:
the portable device periodically measuring a received energy level in the respective one of the plurality of channels;
the portable device comparing the received energy level with a predetermined energy threshold level; and
the portable device switching to a next one of the plurality of channels when the received energy level is below the predetermined energy threshold level.

6. The method of claim 1 further comprising:
the portable device periodically measuring a received energy level in the respective one of the plurality of channels;
the portable device comparing the received energy level with a predetermined energy threshold; and
the portable device continuing to operate in the respective one of the plurality of channels to receive the packet from the respective one of the plurality of access point devices when the received energy level is above the predetermined energy threshold level.

7. The method of claim 6 further comprising the portable device continuing to operate in the respective one of the plurality of channels until all of the packet is received from the respective one of the plurality of access point devices.

8. The method of claim 1 further comprising the portable device using the received network identifier in the packet and the respective network parameter of the respective one of the plurality of access point devices in the memory device of the portable device to transmit the command signal to the respective one of the plurality of access point devices.

9. A portable device comprising:
a transceiver device;
a memory device;
a programmable processor; and
control software stored on a non-transitory computer readable medium, wherein the memory device saves a respective network parameter of each of a plurality of access point devices,
wherein the transceiver devices traverses a plurality of channels in which the plurality of access point devices operate,
wherein the transceiver operates in a respective one of a plurality of channels to receive a packet from a respective one of a plurality of access point devices,
wherein the programmable processor and the control software compare a received network identifier in the packet with the respective network parameter of each of the plurality of access devices in the memory device,
wherein, responsive to a match between the received network identifier in the packet and the respective network parameter of the respective one of the plurality of access point devices in the memory device, the transceiver device transmits a command signal to the respective one of the plurality of access point devices; and
wherein, responsive to the received network identifier in the packet failing to match the respective network parameter of any of the plurality of access point devices in the memory device, the programmable processor and the control software instructing the transceiver device to restart traversing the plurality of channels in which the plurality of access point devices operate.

10. The portable device of claim 9 wherein the packet includes a long, extended preamble.

11. The portable device of claim 10 wherein the packet includes an IEEE 802.15.4 frame format and includes the long, extended preamble in a MAC payload of the packet.

12. The portable device of claim 9 further comprising:
a user interface device,
wherein the transceiver device exits a sleep mode and begins traversing the plurality of channels in which the plurality of access point devices operate responsive to the user interface device receiving user input.

13. The portable device of claim 9 wherein the programmable processor and the control software periodically measure a received energy level in the respective one of the plurality of channels, compare the received energy level with a predetermined energy threshold level, and instruct the transceiver device to switch to a next one of the plurality of channels when the received energy level is below the predetermined energy threshold level.

14. The portable device of claim 9 wherein the programmable processor and the control software periodically measure a received energy level in the respective one of the plurality of channels, compare the received energy level with a predetermined energy threshold level, and instruct the transceiver device to continue operating in the respective one of the plurality of channels to receive the packet from the respective one of the plurality of access point devices when the received energy level is above the predetermined energy threshold level.

15. The portable device of claim 14 wherein the transceiver devices continues to operate in the respective one of the plurality of channels until all of the packet is received from the respective one of the plurality of access point devices.

16. The portable device of claim 9 wherein the transceiver device uses the received network identifier in the packet and the respective network parameter of the respective one of the plurality of access point devices in the memory device to transmit the command signal to the respective one of the plurality of access point devices.

17. A method comprising:
a portable device saving a respective network parameter of each of a plurality of access point devices in a memory device of the portable device;
each of the plurality of access point devices periodically broadcasting a respective packet;
a portable device traversing a plurality of channels in which the plurality of access point devices operate;
the portable device operating in a respective one of the plurality of channels to receive the respective packet from a respective one of the plurality of access point devices;
the portable device comparing a received network identifier in the respective packet with the respective network parameter of each of the plurality of access point devices in the memory device of the portable device;

responsive to a match between the received network identifier in the packet and the respective network parameter of the respective one of the plurality of access point devices in the memory device of the portable device, the portable device transmitting a command signal to the respective one of the plurality of access point devices;

responsive to receiving the command signal, the respective one of the plurality of access point devices forwarding the command signal to a control panel device, and responsive to the received network identifier in the packet failing to match the respective network parameter of any of the plurality of access point devices in the memory device of the portable device, the portable device restarting traversing the plurality of channels in which the plurality of access point devices operate.

18. The method of claim 17 wherein the respective packet includes an IEEE 802.15.4 frame format and includes a long, extended preamble in a MAC payload of the respective packet.

\* \* \* \* \*